United States Patent [19]

Rees

[11] Patent Number: 4,483,938

[45] Date of Patent: Nov. 20, 1984

[54] POLYMERIZATION OF ETHYLENE OR ETHYLENE/α OLEFIN MIXTURES IN THE PRESENCE OF IMPROVED TITANIUM/VANADIUM CATALYST

[75] Inventor: Richard W. Rees, Wilmington, Del.

[73] Assignee: E. I. Du Pont de Nemours and Company, Wilmington, Del.

[21] Appl. No.: 335,632

[22] Filed: Dec. 30, 1981

[30] Foreign Application Priority Data

Jan. 6, 1981 [CA] Canada .................................. 367952

[51] Int. Cl.$^3$ ................................................ C08F 4/64
[52] U.S. Cl. ..................................... 502/113; 526/116
[58] Field of Search ...................... 252/429 C; 502/113

[56] References Cited

U.S. PATENT DOCUMENTS

| | | | |
|---|---|---|---|
| 2,951,045 | 8/1960 | Gamble et al. | 252/429 A |
| 3,032,511 | 5/1962 | Langer et al. | 252/429 C |
| 3,218,266 | 11/1965 | Ludlum | 252/429 C |
| 3,723,350 | 3/1973 | Schmitt et al. | 252/429 C |
| 3,745,154 | 7/1973 | Kashiwa | 252/429 C X |

*Primary Examiner*—Patrick Garvin

[57] ABSTRACT

A solution process for the preparation of high molecular weight homopolymers of ethylene and copolymers of ethylene and $C_3-C_{12}$ α-olefins is disclosed. The process involves feeding monomer, a particlar coordination catalyst and hydrocarbon solvent to a reactor, polymerizing the monomer at a temperature of 100°–320° C. and recovering the polymer. The catalyst is obtained by either (i) combining solutions of titanium tetrahalide/vanadium oxytrihalide and of organoaluminum compound at a temperature of less than 30° C., heating the resulting admixture to a temperature of 150°–300° C. for a period of 5 seconds to 60 minutes and combining the thus heat-treated mixture with a solution of an organoaluminum compound or (ii) combining solutions of titanium tetrahalide and of organoaluminum compound at a temperature of less than 30° C., heating the resultant admixture to a temperature of 150°–300° C. for a period of 5 seconds to 60 minutes, combining the thus heat-treated mixture with vanadium oxytrihalide and then combining the mixture so obtained with a solution of an organoaluminum compound. The catalyst thus obtained is fed to the process, without separation of any compounds of the catalyst.

8 Claims, No Drawings

POLYMERIZATION OF ETHYLENE OR ETHYLENE/α OLEFIN MIXTURES IN THE PRESENCE OF IMPROVED TITANIUM/VANADIUM CATALYST

BACKGROUND OF THE INVENTION

1. Field of the Invention

The present invention relates to a catalyst and a process for the preparation of polymers of α-olefins, especially homopolymers of ethylene and copolymers of ethylene and higher α-olefins. In particular the invention relates to a catalyst and a solution process for the preparation of polymers of α-olefins in which α-olefin monomer is polymerized in the presence of a coordination catalyst capable of being used at relatively high polymerization temperatures, especially temperatures above 150° C.

2. Description of the Prior Art

Polymers of ethylene, for example, homopolymers of ethylene and copolymers of ethylene and higher α-olefins, are used in large volumes for a wide variety of end-uses, for example, in the forms of film, fibres, moulded or thermoformed articles, pipe, coatings and the like.

Processes for the preparation of homopolymers of ethylene and copolymers of ethylene and higher α-olefins are known. Such processes include processes in which the monomers are polymerized in the presence of a coordination catalyst, for example, a catalyst comprising a compound of a transition metal belonging to Groups IVB-VIB of the Periodic Table and an organometallic compound of a metal belonging to Groups I-IIIA of the Periodic Table.

There are two types of processes for the manufacture of polyethylene that involve the polymerization of monomers in the presence of a coordination catalyst viz. those which operate at temperatures below the melting or solubilization temperature of the polymer and those which operate at temperatures above the melting or solubilization temperature of the polymer. The latter are referred to as "solution" processes.

In processes operated below the melting or solubilization temperature of the polymer i.e. low temperature processes, ethylene is converted to solid polymer which remains suspended in an organic solvent as a "slurry" or is fluidized in a gaseous monomer stream. In general the molecular weight of the polymer is controlled by the use of hydrogen. Substantial amounts of hydrogen may be required. Preferred catalysts for the low temperature polymerization processes tend to exhibit high catalytic activity, not to adhere to the surface of the polymerization reactor and to yield polymer of high bulk density and of relatively low molecular weight, thereby lowering the need for hydrogen. In addition the ability of the catalyst to produce polymer in the form of regular and uniform particles may be an advantage.

A preferred process for the polymerization of α-olefins is the high temperature or "solution" polymerization process, an example of which is described in Canadian Patent 660 869 of A. W. Anderson, E. L. Fallwell and J. M. Bruce, which issued 1963 April 9. In a solution process the process is operated so that both the monomer and polymer are soluble in the reaction medium. Under such conditions accurate control over the degree of polymerization, and hence the molecular weight of the polymer obtained, is achieved by control of the reaction temperature. It is believed that the termination reaction controlling the molecular weight of the polymer is highly dependent of temperature. In an embodiment of a solution process, the molecular weight of the polymer may be further controlled through the use of relatively small amounts of hydrogen, as is described in Canadian Patent 703 704 of C. T. Elston, which issued 1965 February 9.

There are a number of advantages to a solution polymerization process, for example, the ability to control the molecular weight of the polymer obtained, the ability to operate the process as a continuous process and to recover the polymer by precipitation without the need for washing, the efficient use of catalyst, the properties of the polymer obtained and the possibility of efficient use of energy.

A disadvantage of a solution process is that part of the catalyst remains in the polymer of ethylene. Such catalyst, which may be referred to herein as "catalyst residue", may contribute to degradation of the polymer during subsequent processing of the polymer e.g., in extrusion, injection molding and the like, and/or on exposure of fabricated articles to ultra violet light. The amount of catalyst residue is related, at least in part, to the overall activity of the catalyst employed in the polymerization step of the process as the higher the overall activity of the catalyst the less catalyst that is, in general, required to effect polymerization at an acceptable rate. Catalysts of relatively high overall activity are therefore preferred in solution polymerization processes.

Two important factors in determining the overall activity of a catalyst are the instantaneous activity of the catalyst and the stability of the catalyst under the operating conditions, especially at the operating temperature. Many catalysts that are stated to be very active in low temperature polymerization processes also exhibit high instantaneous activity at the higher temperatures used in solution processes. However such catalysts tend to decompose within a very short time in a solution process and thus the overall activity is disappointingly low. Such catalysts are of no commercial interest for solution processes. Other catalysts may exhibit acceptable overall activity at the higher temperatures of a solution process but show tendencies to yield polymers of broad molecular weight distribution or of too low a molecular weight to be commercially useful for the manufacture of a wide range of useful products. The requirements for and the performance of a catalyst in a solution polymerization process are quite different from those of a catalyst in a low temperature polymerization process, as will be understood by those skilled in the art.

A process for the preparation of polymers of ethylene at high temperatures in which the catalyst is a coordination catalyst consisting of titanium tetrachloride, a vanadium compound and aluminum trialkyl and capable of being used in a solution process is described in Canadian Patent 635 823 of D. B. Ludlum, N. G. Merckling and L. H. Rombach, which issued 1962 February 6.

The preparation of a heat-treated polymerization catalyst particularly adapted for the low temperature polymerization of propylene is described in Canadian Patent 787 408 of R. H. Jones, which issued 1968 June 11. The catalyst is prepared by adding to a halide of a transition metal in its highest valence state the amount of an organometallic compound required to reduce the valence state of the transition metal by one, heat treating the admixture so obtained to form the violet form of titanium trichloride and then activating the resultant product with additional organometallic compound.

It is believed that the active species of a titanium-containing coordination catalyst is a reduced form of titanium, especially in the form of titanium trichloride. G. Natta et al discuss the crystalline modifications of titanium trichloride in J. Poly. Sci 51 399–410(1961). The performance of titanium trichloride as a catalyst species appears to relate to its crystal form, crystal size distribution, adsorbed species and the like which in turn depend on the method used in the preparation of the catalyst. A commercially available form of a titanium trichloride polymerization catalyst is $TiCl_3.1/3\ AlCl_3$ which is available from Stauffer Chemical Co. of Westport, Conn., U.S.A., under the trade designation "TiCl$_3$AA". The violet form of titanium trichloride may be formed in the reactor of a solution polymerization process, especially when the temperature in the reactor is above 150° C.

SUMMARY OF THE INVENTION

A solution polymerization process for the preparation of homopolymers of ethylene and copolymers of ethylene and higher α-olefins, in which the catalyst is a coordination catalyst prepared by heat-treating a particular admixture of a titanium halide and an organoaluminum compound and then activating with further organoaluminum compound, in which vanadium oxytrihalide is added during preparation of the catalyst, has now been found. The catalyst has surprisingly good stability at the high temperatures employed in a solution polymerization process.

Accordingly the present invention provides in a solution process for the preparation of high molecular weight polymers of α-olefins selected from the group consisting of homopolymers of ethylene and copolymers of ethylene and $C_3$–$C_{12}$ α-olefins, said process comprising feeding monomer selected from the group consisting of ethylene and mixtures of ethylene and at least one $C_3$–$C_{12}$ α-olefin, a coordination catalyst and inert hydrocarbon solvent to a reactor, polymerizing said monomer at a temperature in the range of from about 100° to about 320° C. and recovering the polymer so obtained, the improvement wherein said coordination catalyst is obtained by combining a first component with a second component, said first component being prepared by a method selected from the group consisting of (i) admixing a solution of an organoaluminum compound in inert hydrocarbon solvent with a solution of titanium tetrahalide and vanadium oxytrihalide in inert hydrocarbon solvent at a temperature of less than about 30° C. and heating the resultant admixture to a temperature of from about 150° to about 300° C. for a period of from about 5 seconds to about 60 minutes and (ii) admixing a solution of an organoaluminum compound in inert hydrocarbon solvent with a solution of titanium tetrahalide in inert hydrocarbon solvent at a temperature of less than about 30° C., heating the resultant admixture to a temperature of from about 150° to about 300° for a period of from about 5 seconds to about 60 minutes and admixing vanadium oxytrihalide with the admixture so obtained, said organoaluminum compound having the formula $AlR_nX_{3-n}$ and being admixed with the titanium and vanadium compounds so that in the first component the atomic ratio of aluminum to titanium plus vanadium is in the range of from about 0.2 to about 2.0, and the atomic ratio of titanium to vanadium is in the range of from about 1:1 to about 30:1 said second component being a solution of organoaluminum compound in inert hydrocarbon solvent, said organoaluminum compound also having the formula $AlR_nX_{3-n}$, said first and second components being combined so that in the second component the atomic ratio of aluminum to titanium plus vanadium is in the range of from about 0.7 to about 5; where R is alkyl, cycloalkyl, aryl or alkyl-substituted aryl and has 1–20 carbon atoms, n=1, 1.5, 2 or 3 and X is halogen.

In an embodiment of the process of the present invention, the catalyst components are mixed in-line and fed to the reactor without separation of any fraction therefrom.

In another embodiment, the organoaluminum compounds of the first and second components are the same.

In a further embodiment any halogen of the organoaluminum compound, the titanium tetrahalide and the vanadium oxytrihalide is chlorine.

DETAILED DESCRIPTION OF THE INVENTION

The present invention is directed to a process for the preparation of high molecular weight polymers of α-olefins, such polymers being intended for fabrication into articles by extrusion, injection molding, thermoforming, rotational molding and the like. In particular the polymers of α-olefins and homopolymers of ethylene and copolymers of ethylene and higher α-olefins, especially such higher α-olefins having 3 to 12 carbon atoms i.e. $C_3$–$C_{12}$ α-olefins, examples of which are 1-butene, 1-hexene and and 1-ocetene. In addition cyclic endomethylenic dienes may be fed to the process with the ethylene or mixtures of ethylene and $C_3$–$C_{12}$ α-olefin. Such polymers are known.

In the process of the present invention, monomer, a coordination catalyst and inert hydrocarbon solvent are fed to a reactor. The monomer may be ethylene or mixtures of ethylene and at least one $C_3$–$C_{12}$ α-olefin, preferably ethylene or mixtures of ethylene and one $C_4$–$C_{10}$ α-olefin. The coordination catalyst is formed by combining a first component with a second component. Two methods may be used to obtain the first component. In one method, the first component is obtained by admixing, rapidly, a solution of an organoaluminum compound in inert hydrocarbon solvent with solution of a titanium tetrahalide and vanadium oxytrihalide in inert hydrocarbon solvent so that the atomic ratio of aluminum to titanium plus vanadium is in the range of about 0.2–2.0, preferably about 0.3–0.9. The preferred ratio may depend on the particular organoaluminum compound used in the preparation of the catalyst. The resultant admixture is then heat treated at about 150°–300° C. for a period of from about 5 seconds to about 60 minutes, preferably from about 10 seconds to about 10 minutes. In the second method, the first component is obtained by admixing, rapidly, a solution of an organoaluminum compound in inert hydrocarbon solvent with a solution of titanium tetrahalide in inert solvent. The resultant admixture is then heat-treated at about 150°–300° C. for a period of from about 5 seconds to about 60 minutes, preferably from about 10 seconds to about 10 minutes. Vanadium oxytrihalide, optionally admixed with the titanium tetrahalide, is then admixed with the heat-treated admixture so that the atomic ratio of aluminum to titanium plus vanadium is in the range of about 0.2–2.9, preferably about 0.3–0.9. The preferred ratio may depend on the particular organoaluminum compound used in the preparation of the catalyst.

The second component is a solution of an organoaluminum compound in inert hydrocarbon solvent. The two components of the catalyst are combined so that the atomic ratio of aluminum in the second component to titanium plus vanadium in the first component is in the range of from about 0.7 to about 5, preferably from about 1.2 to about 3.

The organo aluminum compounds are each, independently, of the general formula $AlR_nX_{3-n}$ where R is an alkyl, cycloalkyl, aryl or aryl-substituted alkyl and has 1 to 20 carbon atoms, n is 3, 2, 1.5 or 1, and X is a halogen. In preferred embodiments n is 3, or especially, 2. R is preferably phenyl or alkyl, particularly alkyl of 1–4 carbon atoms. X is preferably bromine or chlorine. In preferred embodiments the organoaluminum compound is trialkyl aluminum, especially triethyl aluminum, or dialkylaluminum chloride, especially diethylaluminum chloride.

The organoaluminum compound in the first component may be the same as or different from the organo-aluminum compound of the second component. It will, however, be generally convenient, and preferred, to use the same organoaluminum compound in both the first and the second components.

The preferred titanium tetrahalides are titanium tetrabromide and especially titanium tetrachloride. Mixtures of such tetrahalides may be used.

In the process of the present invention, the first component contains both titanium tetrahalide and vanadium oxytrihalide, preferably vanadium oxytrichloride. The solution of titanium tetrahalide and vanadium oxytrihalide is such that in the first component the atomic ratio of aluminum to titanium plus vanadium is in the range of about 0.2–2.0 and in the second component the atomic ratio of aluminum to titanium plus vanadium is in the range of about 0.7–5. In the process of the present invention the ratio of titanium to vanadium on an atomic basis is from about 1:1 to about 30:1. In preferred embodiments, the ratio of titanium to vanadium in an atomic basis is in the range of from about 3:1 to about 10:1, and most preferably it is about 5:1.

The use of catalysts not containing vanadium is disclosed and claimed in the copending application of V. G. Zboril and M. A. Hamilton being filed simultaneously herewith U.S. Ser. No. 335,633, now U.S. Pat. No. 4,431,784.

The concentration of the components of the solutions used in the preparation of the catalyst is not critical and is primarily governed by practical considerations. The combining of the components is exothermic and the resultant evolution of heat is a factor in determining the upper concentration limits of the solutions. Concentrations up to about 50%, on a weight basis, may however be used. The lower concentration limits are related to practical considerations for example the amount of solvent required, the equipment being used and the like. Concentrations of as low as 25 ppm, on a weight basis, may be used but higher concentrations, for example 100 ppm and above, are preferred.

It is important to admix the two solutions of the first component at ambient or lower temperatures i.e. lower than about 30° C., and permit reaction to occur for some minimum time. This time depends on the type of organoaluminum compound used and may be as short as 15 seconds after adequate mixing has been achieved. The subsequent heat treatment of the admixture of the first component may be performed by, for example, heating the admixture in a heat exchanger or by addition of a heated inert hydrocarbon solvent. Heat treatment is carried out at about 150°–300° C., especially about 170° to 250° C. The admixture should be held at the elevated temperature for a period of time in the range of from about 5 seconds to about 60 minutes, preferably from about 10 seconds to about 10 minutes and especially from about 1 to 3 minutes, before it is combined with the second component. The first component may be fed into the polymerization reactor separately from the second component or the first and second components may be combined prior to being fed to the reactor.

The solvent used in the preparation of the coordination catalyst is an inert hydrocarbon, in particular a hydrocarbon that is inert with respect to the coordination catalyst. Such solvents are known and include for example, hexane, heptane, octane, cyclohexane, methylcyclohexane and hydrogenated naphtha. The solvent used in the preparation of the catalyst is preferably the same as that fed to the reactor for the polymerization process.

The coordination catalyst described herein is used in the process of the present invention without separation of any of the components of the catalyst. In particular neither liquid nor solid fractions are separated from the catalyst before it is fed to the reactor. Thus the preparation of the catalyst is a simple procedure and in a preferred embodiment involves in-line mixing and heat-treatment of the catalyst that is to be fed to the reactor.

The catalyst described herein may be used, according to the process of the present invention, over the wide range of temperature that may be used in an α-olefin polymerization process operated under solution conditions. For example, such polymerization temperatures may be in the range of from about 100° to about 320° C. and especially in the range of about 105°–310° C. The pressures used in the process of the present invention are those known for solution polymerization processes, for example, pressures in the range of about 4–20 MPa.

In the process of the present invention the α-olefin monomers are polymerized in the reactor in the presence of the catalyst. Pressure and temperature are controlled so that the polymer formed remains in solution. Small amounts of hydrogen, for example 1–40 parts per million by weight, based on the total solution fed to the reactor, may be added to the feed in order to improve control of the melt index and/or molecular weight distribution and thus aid in the production of a more uniform product, as is disclosed in the aforementioned Canadian Patent 703 704. The catalyst is usually deactivated, for example by contacting with a fatty acid or an alcohol, immediately after the polymer leaves the reactor.

After deactivation of the catalyst the polymer may be passed through a bed of activated alumina or bauxite which removes part or all of the deactivated catalyst residues; however under some circumstances it may not be necessary to remove such residues from the polymer. The solvent may then be flashed off from the polymer which subsequently may be extruded into water and cut into pellets or other suitable comminuted shapes. Pigments, antioxidants and other additives may be added to the polymer either before or after the polymer is initially formed into pellets or other comminuted shapes.

As is illustrated in the examples below, the heat-treated catalyst exhibits good stability at very high temperatures when compared with catalysts which are not heat-treated. It will also be noted that the catalyst of the process of the present invention is prepared by rapid in-line mixing of liquid components without separation of any fraction therefrom, for example by isolation and/or purification of any intermediate products, which greatly reduces the cost of using such catalyst.

The process of the present invention may be used to prepare homopolymers of ethylene and copolymers of ethylene and higher α-olefins having densities in the range of, for example, about 0.900–0.970 g/cm³ and especially about 0.915–0.965 g/cm³; the polymers of higher density, e.g. about 0.960 and above, being homopolymers. Such polymers may have a melt index, as measured by the method of ASTM D-1238, condition E, in the range of, for example, about 0.1–200, and especially in the range of about 0.3–120. The polymers may be manufactured with narrow or broad molecular weight distribution. For example, the polymers may have a stress exponent, a measure of molecular weight distribution, in the range of about 1.1–2.5 and especially in the range of about 1.3–2.0. Stress exponent is determined by measuring the throughput of a melt indexer at two stresses (2160 g and 6480 g loading) using the procedures of the ASTM melt index test method, and the following formula:

$$\text{Stress exponent} = \frac{1}{0.477} \log \frac{(\text{wt. extruded with 6480 g wt.})}{(\text{wt. extruded with 2160 g wt.})}$$

Stress exponent values of less than about 1.40 indicate narrow molecular weight distribution while values above about 2.00 indicate broad molecular weight distribution.

The polymers produced by the process of the present invention are capable of being fabricated into a wide variety of articles, as is known for homopolymers of ethylene and copolymers of ethylene and higher α-olefins.

In the examples hereinafter the following procedures were used unless specified otherwise:

(i) Polymerization in a stirred reactor: The reactor was a 70 ml (depth=11.3 mm, diameter=88.9 mm) pressure vessel fitted with a six-bladed agitator having a diameter of 66.7 mm, a heating jacket, pressure and temperature controllers, two feed lines and an outlet line. The feed lines were located adjacent to the tips of the agitator blades while the outlet line was adjacent to the centre of the agitator. All the ingredients i.e., catalyst and monomers, were prepared as solutions in cyclohexane which had been purified by being passed through a silica gel bed, stripped with nitrogen and passed through another silica gel bed followed by beds of 4X molecular sieve and of alumina. The rates of feed of the first and second components of the catalyst were adjusted to produce the desired conditions in the reactor.

The first component of the catalyst was prepared from the individual solutions by either (a) using in-line mixing viz. by admixing the solutions using a 6.4 mm "T" union, (b) using a high turbulence mixing zone viz. by injecting one solution through a 1.6 mm OD tubing placed axially in the centre of a 6.4 mm OD tube through which the other solution was being passed, or (c) by admixing the individual solutions in a vessel from which the resultant admixture was being withdrawn as required, the admixture in the vessel being agitated using a stream of purified nitrogen. The desired hold-up times were achieved by adjusting the length of the tubing through which the components were being passed. All streams were preheated to the reaction temperature shortly before entering the reactor. The reactor pressure was kept constant at 7.5 MPa. The pumping rates and temperatures were maintained constant during each experiment. The initial (no conversion) monomer concentration in the reactor was 1–2 wt % in all experiments. A deactivator (calcium octoate solution in cyclohexane, about 0.25% Ca) was injected into the reactor effluent at the reactor exit. The pressure of the stream was then reduced to about 110 kPa (Abs.) and the unreacted monomer was continuously stripped off with nitrogen. The amount of unreacted monomer was monitored by gas chromatograph. The catalyst activity was defined as:

$$Kp = \frac{S.V. \times d[Q/(1-Q)]}{dc}$$

where Q is the conversion, i.e. the fraction of ethylene (monomer) converted to polymer at the optimum ratio of the first and second components, S.V. is the space velocity in the stirred reactor in min$^{-1}$ and c is the catalyst concentration, based on titanium plus vanadium, in the reactor in mmol/l. Kp was obtained by measuring the conversion Q at various concentrations of the first and second components.

After stripping the volatiles (monomers) from the product obtained, the product was cooled to about 20° C. and diluted with an equal volume of 2-propanol. 0.1% of Irganox® 1010 antioxidant was added. The polymer was filtered from the resultant suspension and dried at about 20° C. in the dark.

(ii) Polymerization in a tubular reactor: The tubular reactor was 332 mm long with an initial diameter of 14.3 mm, decreasing in two steps to 11.1 mm and 6.35 mm respectively along its length. The total volume of the reactor was 27 ml. The front (inlet) end of the reactor was provided with three inlet ports; a stationary mixer was located downstream from the inlet ports. The incoming streams and the reactor conditions were kept constant during each experiment; in other respects, the tubular reactor was operated in a similar manner to the stirred autoclave. The catalyst activity for polymerizations in a tubular reactor is defined as:

$$Kp = \frac{d[\ln 1/(1-Q)] \times S.V.}{dc}$$

the symbols being as defined above.

The present invention is illustrated by the following examples. In the examples the solvent was cyclohexane and the monomer was ethylene unless specified to the contrary.

EXAMPLE I

The first component was prepared by in-line mixing a 3.6 mmol/l solution of titanium tetrachloride and vanadium oxytrichloride and a 3.6 mmol/l solution of diethylaluminum chloride at 25° C. The atomic ratio of aluminum to titanium plus vanadium was 1.0. After 40 seconds the resultant admixture was heated to 225° C. by injecting a stream of cyclohexane preheated to a temperature of 320° C. into the admixture. The resultant first component was maintained at 225° C. for 1.5 minutes and was then fed into the stirred reactor. The second component, a stream of 10 mmol/l triethyl aluminum, was mixed in-line with the ethylene solution and fed into the reactor. The rate of addition of the second component was adjusted so that the optimum catalyst activity was obtained. The atomic ratio of aluminum in the second component to titanium plus vanadium was 2.0. The polymerization was carried out at 200° C. and 0.33 min$^{-1}$ S.V.

The results obtained using different atomic ratios of titanium to vanadium were as follows:

| Run No. | Ti/V Ratio | Catalyst Activity |
|---------|------------|-------------------|
| 1 | 95/5 | 9.73 |
| 2 | 85/15 | 66.6 |
| 3 | 75/25 | 64.0 |

This example shows the use of a catalyst containing titanium and vanadium.

EXAMPLE II

The first and second components of the catalyst were prepared as in Example I except that the atomic ratio of titanium to vanadium was 75:25 and the atomic ratio of aluminum in the second component to titanium plus vandium was 1.84. The polymerization was carried out at 235° C. and 0.37 min$^{-1}$ S.V. The catalyst activity was Kp=20.5

COMPARATIVE EXAMPLE I

In a comparative experiment, the catalyst was prepared by in-line mixing a 1.8 mmol/l solution of titanium tetrachloride with a 3.6 mmol/l solution of triethyl aluminum. At room temperature (25° C.), the catalyst solution was injected into the stirred reactor. The reactor temperature was 200° C. and the space velocity 0.85 min$^{-1}$. The optimum activity was obtained with an atomic ratio of aluminum to titanium of 1.65. The activity measured was Kp=1.36.

This example shows that heat treatment in the polymerization zone gives a catalyst of relatively poor activity.

COMPARATIVE EXAMPLE II

In another comparative experiment the first component was prepared by in-line mixing a 2.8 mmol/l solution of titanium tetrachloride with a 0.93 mmol/l solution of triethyl aluminum in the ratio of 0.33 (aluminum:titanium, atomic basis) at 25° C. However the first component was not heat treated. About 2 minutes later the second component, a 3.27 mmol/l solution of triethyl aluminum, was mixed with the first component. The resultant catalyst was fed to the tubular reactor after an additional 30 seconds. The reactor temperature was 200° C. The optimum activity was achieved when the atomic ratio of aluminum in the second component to titanium was 2.45. The activity was Kp=4.4 and 2.9 at S.V. of 0.85 and 0.75 min$^{-1}$ respectively.

Although these results show improved activity over that of the catalyst of Comparative Example I, the catalyst stability is poor in that Kp falls substantially when the space velocity is reduced i.e. longer "hold-up time" at the reactor temperature.

COMPARATIVE EXAMPLE III

In a comparative experiment the first component was prepared by in-line mixing a 3.17 mmol/l solution of titanium tetrachloride and a 1.06 mmol/l solution of triethyl aluminum in the ratio of aluminum to titanium of 0.33 (atomic basis). The two solutions were heated to 180° C. before mixing to form the first component and then kept at 180° C. for an additional 7.5 minutes. The first component was then cooled to about 25° C. and a 3.8 mmol/l solution of triethyl aluminum was admixed in-line. The optimum activity was achieved when the second component was added so that the atomic ratio of aluminum in the second component to titanium was 1.2. The resultant catalyst solution was fed into the tubular reactor. The polymerization activity of the catalyst was very low. Even if the polymerization temperature was lowered to 170° C. the activity obtained was Kp<0.69 at S.V.=0.27 min$^{-1}$.

This example shows that heating the two solutions of the first component prior to admixing results in no appreciable activity in the resultant catalyst.

COMPARATIVE EXAMPLE IV

In a further comparative experiment the first component was prepared by in-line mixing a 3.6 mmol/l solution of titanium tetrachloride with a 1.6 mmol/l solution of triethylaluminum at 25° C. In different experiments four ratios of titanium to aluminum were used. After about one minute the admixtures obtained were heated, in a heat exchanger, to 170° C. and maintained at that temperature for 2.5 minutes. Without cooling, the resultant first component was continuously admixed with the second component, a 6.5 mmol/l solution of triethylaluminum. After about 15 seconds, the catalyst so formed was fed to the stirred reactor. The polymerization temperature was 200° C. and the S.V. was 0.33 min$^{-1}$. The optimum activity of the catalyst was achieved when the atomic ratio of aluminum in the second component to titanium was 2.7 in all cases.

The results obtained were as follows:

| Run | Aluminum/Titanium Ratio in First Component | Catalyst Activity Kp |
|-----|--------------------------------------------|----------------------|
| 4 | 0.17 | 0.6 |
| 5 | 0.25 | 6.3 |
| 6 | 0.33 | 12.6 |
| 7 | 0.50 | 9.0 |

EXAMPLE III

The first component of the catalyst was obtained by suspending TiCl$_3$ AA catalyst, from Stauffer Chemical Co., in the first component and fed to a stirred reactor. The rate of addition was adjusted to obtain an optimum activity, as measured by the rate of consumption of ethylene in the polymerization process, under the conditions being used. The atomic ratio of the amount of aluminum in the second component to the amount of titanium in the first component was 1.75. The polymerization temperature was 170° C. The activity, Kp, of this coordination catalyst in the polymerization of ethylene was 1.1 at a space velocity of 0.266 min$^{-1}$.

This example shows that use of a commercial TiCl$_3$.1/3 AlCl$_3$ catalyst is inferior to the process of the present invention, even though the temperature was only 170° C.

EXAMPLE IV

The first component of the catalyst was prepared, under dry nitrogen, by one of the following procedures:

In procedure A, a solution of titanium tetrachloride in decahydronaphthalene was cooled to −25° C. and admixed with aluminum alkyl. After a period of 5 to 15 minutes, the resultant liquid was heated, with stirring, to 180° C. After one hour at 180° C., the heat-treated solution was admixed with vanadium oxytrichloride, the latter being added as a solution of vanadium oxytrichloride/titanium tetrachloride (4:1) in cyclohexane. A small amount of polyisobutylene (M.W. 117 000–135 135 000) was then added to retard settling of any solid phase.

Procedure B was identical to Procedure A except that the solution of vanadium oxytrichloride/titanium tetrachloride was added to the solution of titanium tetrachloride prior to addition of the aluminum alkyl and heat treatment.

In the polymerization reaction, the first component of the catalyst was fed to a continuous flow, well agitated reactor (volume 5.3 ml) together with a solution of ethylene in cyclohexane (9–11% ethylene by weight) and a solution of triisobutyl aluminum in cyclohexane. The polymerization temperature was 230° C. and the S.V. was 0.67 min$^{-1}$. After the solution passed from the reactor, the catalyst was deactivated with isopropanol and polymer was recovered.

In addition to Runs 8–15 Table I hereinafter in which the above procedures were used, two comparative runs were made. In the first, Run 16, the first component of the catalyst was made by admixing titanium tetrachloride with titanium tetrachloride/vanadium oxytrichloride in decahydronaphthalene. This component was not admixed with aluminim alkyl or heat treated. In the second comparative run, Run 17, triethyl aluminum was added to a solution obtained by adding titanium tetrachloride to a solution of vanadium oxytrichloride/titanium tetrachloride in decahydronaphthalene. Polyisobutylene was dissolved in the solution thus obtained. The resultant first component was not heat treated.

Further experimental details and the results obtained are given in Table I.

EXAMPLE V

The polymerization reaction of Run 8 was repeated at 230° C. using triethyl aluminum as the second component. The Kp obtained was 16.5.

EXAMPLE VI

The polymerization reaction of Run 8 was repeated at 200° C. using triisobutyl aluminum as the second component. The Kp obtained was 60.6.

EXAMPLE VII

A batch of the first component was prepared by injecting a 1.476 moles/l solution of diethylaluminum chloride with a 3.75 mmoles/l solution of titanium tetrachloride/vanadium oxytrichloride (atomic ratio of titanium to vanadium of 85:15) at 25° C. The atomic ratio of aluminum to titanium plus vanadium was 1.0. The resultant admixture was heated to 225° C. by injecting a stream of cyclohexane preheated to a temperature of 320° C. into the admixture. The resultant first component was maintained at 225° C. for 1.5 minutes and was then fed into the stirred reactor. The second component, a stream of 7.5 mmoles/l of triethyl aluminum, was fed to the reactor along with a monomer stream of ethylene and butene-1 (molecular ratio 6.45:1) in cyclohexane. The rate of addition of the second component was adjusted so that the optimum catalyst activity was obtained. The atomic ratio of aluminum in the second component to titanium plus vanadium was 2.3:1. The polymerization was carried out at 200° C. and a S.V. of 3.34 min$^{-1}$. The catalyst activity was Kp=11.6 and the ethylene/butene-1 copolymer obtained had a density of 0.9215 g/cm$^3$.

This example shows the use of a catalyst of the invention in the copolymerization of ethylene and a comonomer viz. butene-1.

TABLE I

| Run No. | Ti/V Ratio | Al: (Ti + V) (1st component) | Al: (Ti + V) (2nd component) | Catalyst Activity Kp |
|---|---|---|---|---|
| 8 | 5 | 0.27 | 2.0 | 19.7 |
| 9 | 5 | 0.33 | 1.5 | 16.0 |
| 10 | 5 | 0.31 | 2.4 | 16.7 |
| 11 | 5 | 1.0 | 2.3 | 8.2 |
| 12 | 10 | 0.30 | 2.1 | 14.5 |
| 13 | 20 | 0.31 | 2.4 | 6.67 |
| 14 | 1 | 0.3 | 1.85 | 22 |
| 15 | 1 | 0.66 | 1.65 | 22.4 |
| 16 | 5 | 0.00 | 2.0 | 3.7 |
| 17 | 1 | | 2.4 | 12.9 |

Notes:
1. The polymers of Runs 8–15 had melt indices in the range 0.6–1.6 and stress exponents in the range 1.27–1.48.
2. The first component of Runs 8–15 was made using triethyl aluminum except for Run 11 where diethyl aluminum chloride was used.
3. Procedure A was used in Runs 8 and 12. Procedure B was used in Runs 9–11 and 13–15.

I claim:
1. A coordination catalyst obtained by combining a first component with a second component,
   the first component being prepared by a method selected from the group consiting of (i) admixing a solution of an organoaluminum compound in inert hydrocarbon solvent with a solution of titanium tetrachloride and vanadium oxytrichloride in inert hydrocarbon solvent at a temperature of less than about 30° C. and heating the resultant admixture to a temperature of from about 150° to about 300° C. for a period of from about 5 seconds to about 60 minutes and (ii) admixing a solution of an organoaluminum compound in inert hydrocarbon solvent with a solution of titanium tetrachloride in inert hydrocarbon solvent at a temperature of less than about 30° C., heating the resultant admixture to a temperature of from about 150° to about 300° C. for a period of from about 5 seconds to about 60 minutes and admixing vanadium oxytrichloride with the admixture so obtained, said organoaluminum compound having the formula AlR$_n$X$_{3-n}$ and being admixed with the titanium and vanadium compounds so that in the first component the atomic ratio of aluminum to titanium and vanadium is in the range of from about 0.2 to about 2.0 and the atomic ratio of titanium to vanadium is in the range of from about 1:1 to about 30:1
   said second component being a solution of organoaluminum compound in inert hydrocarbon solvent, said organoaluminum compound also having the formula AlR$_n$X$_{3-n}$,
   said first and second components being combined so that in the second component the atomic ratio of aluminum to titanium and vanadium is in the range of from about 0.7 to about 5; where R is alkyl, cycloalkyl, aryl or alkyl-substituted aryl and has 1–20 carbon atoms, n=1, 1.5, 2 or 3 and X is chlorine or bromine.

2. The catalyst of claim 1 in which the catalyst components are mixed in-line and fed to a polymerization reactor without separation of any fraction therefrom.

3. The catalyst of claim 1 in which the organoaluminum compound of the first component is the same as that of the second component.

4. The catalyst of claim 1 in which the organoaluminum compound of the first component is different from that of the second component.

5. The catalyst of claim 3, in which the organoaluminum compound is triethyl aluminum.

6. The catalyst of claim 5 in which the first component is heated for a period of from about 10 seconds to about 10 minutes.

7. The catalyst of claims 1, 2, 5, or 6 wherein the ratio of titanium to vanadium on an atomic basis is in the range of from about 3:1 to about 10:1.

8. The catalyst of claim 1, 2, 5, or 6 wherein the ratio of titanium to vanadium on an atomic basis is about 5:1.

* * * * *